E. L. ROBERSON.
FISH HOOK.
APPLICATION FILED DEC. 17, 1909.
956,176.
Patented Apr. 26, 1910.
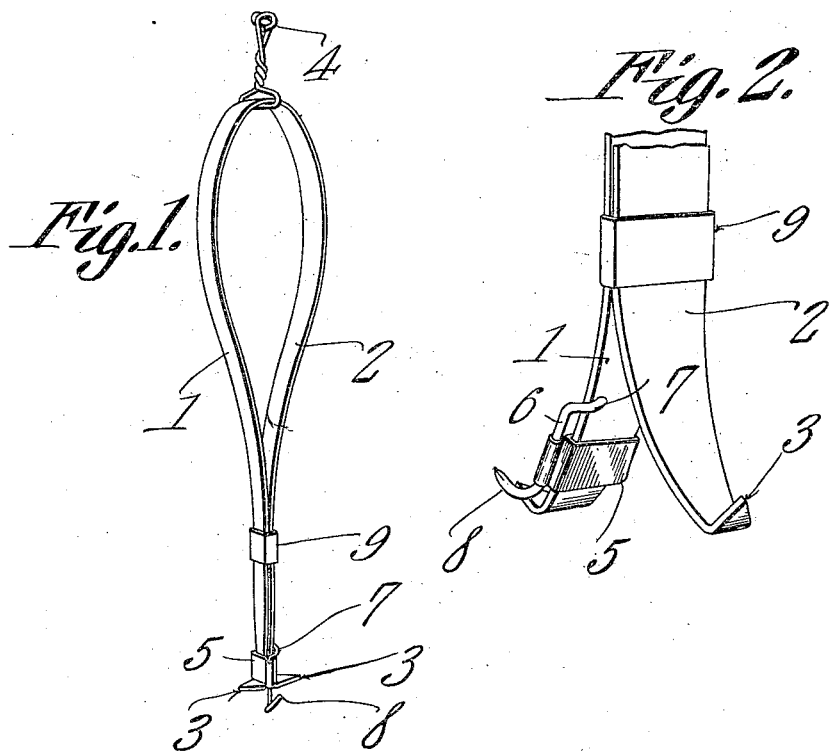
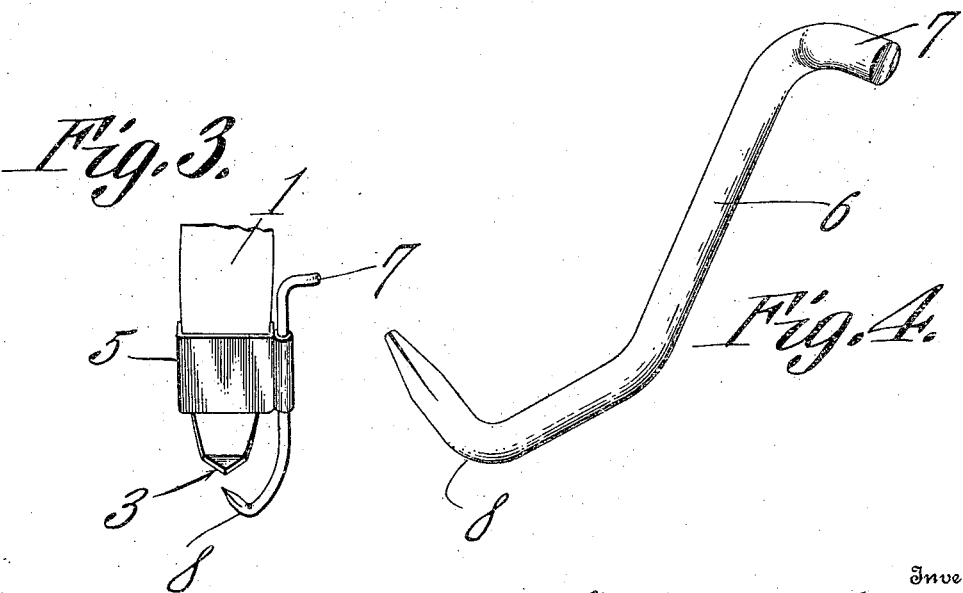

UNITED STATES PATENT OFFICE.

ELIGE L. ROBERSON, OF TYLER, TEXAS.

FISH-HOOK.

956,176.  Specification of Letters Patent.  Patented Apr. 26, 1910.

Application filed December 17, 1909. Serial No. 533,565.

*To all whom it may concern:*

Be it known that I, ELIGE L. ROBERSON, a citizen of the United States, residing at Tyler, in the county of Smith and State of Texas, have invented a new and useful Fish-Hook, of which the following is a specification.

It is the object of this invention to provide in a simple and merchantable form, a trapping device, adapted primarily, although not exclusively, to serve as a fish-hook, novel means being provided for locking the trapping portions of the device in set position, and for releasing said portions, so that the same may engage the animal seeking to remove the bait from the device.

With these and other objects in view, the invention consists in the novel construction and arrangement of parts hereinafter described, delineated in the accompanying drawings, and specifically claimed, it being understood, that, since the drawings show but one form of the invention, changes, properly falling within the scope of what is claimed, may be made, without departing from the spirit of the invention.

Similar numerals of reference are employed to denote corresponding parts throughout the several figures of the drawings.

In the accompanying drawings,—Figure 1 shows the invention in perspective, the trapping arms thereof being set; Fig. 2 is a fragmental perspective showing the trapping arms sprung; Fig. 3 is a fragmental side elevation; and Fig. 4 is a perspective of the trigger.

The body of the device is fashioned from a piece of resilient metal bent into approximately U shape, to form trapping arms 1 and 2, provided, at their free ends, with outstanding, oppositely extending prongs 3. Slidably mounted upon the intermediate portion of the body of the device, is an eye 4, of any desired construction, whereby the device may be assembled with a fish-line. Slidably mounted upon the arm 1, and arranged to inclose the same, is a rider 5 in which is mounted, longitudinally of the arm 1, to rock in the rider 5, transversely of said arm, a trigger 6, having at one end, a radially extending finger 7, there being at the other end of the trigger 6, a bait-engaging element, disposed at an angle to the finger 7, the bait-engaging element in the present instance being shown in the form of a hook 8. A clasp 9 incloses the arms 1 and 2, and is adapted to slide thereon, the clasp thus forming a loop at the upper portion of the device, the prong-carrying extremities of the arms 1 and 2 diverging below the clasp.

In practical operation, the trigger 6 is rocked in the rider 5 to cause the finger 7 to engage the arm 2, thus holding the arms 1 and 2 together, and disposing the prongs 3 in close relation. A bait of any desired form is then mounted upon the hook 8, and when the fish or other animal seizes the bait, the trigger 6 will be rocked in the rider 5, freeing the finger 7 from its engagement with the arm 2. The prongs 3 will then fly apart, engaging and firmly holding the animal. By sliding the clasp 9 along the arms 1 and 2, the space which exists between the prongs 3 after the device has been sprung, may be adjusted. By this construction, the prongs 3 may be so adjusted that when the device is sprung, the prongs will not tear their way out of the mouth of a small fish, the distance between the prongs 3 being likewise capable of adjustment to accommodate and firmly to hold, larger fishes. The rider 5 will, under ordinary conditions, be disposed relatively near to the prongs 3, in order that the said prongs may be disposed as closely together as possible when the device is set. If desired, however, the rider may be slid toward the clasp 9 to any desired extent, before the device is set. The advantage of this construction is that by thus adjusting the position of the rider upon the arm 1, the outward spring of the arms may be adjusted. Thus, when taking fish, the mouths of which are large, but tender, the rider 5 may be disposed relatively near to the clasp 9, so that when the device is sprung, the prongs 3 may not move apart with sufficient force to tear their way out of the mouth of the fish.

Having thus described the invention what is claimed is;—

1. A device of the class described comprising resilient trapping arms; a trigger carried by one of said arms longitudinally thereof and arranged to rotate in a position substantially parallel to said arm and transversely thereof, the trigger having at one end, a finger to engage the other arm to hold the arms in close relation, and having at the other end, a bait-engaging element disposed at an angle to the finger.

2. A device of the class described comprising resilient trapping arms; a trigger slidably carried by one of said arms longitudinally thereof and arranged to rotate in a position substantially parallel to said arm and transversely thereof, the trigger having at one end, a finger to engage the other arm to hold the arms in close relation, and having at the other end, a bait-engaging element disposed at an angle to the finger.

3. A device of the class described comprising resilient trapping arms; a rider slidably mounted upon one of said arms; a trigger arranged to rock in the rider transversely of the rider-supporting arm, the trigger having at one end, a finger to engage the other arm to hold the arms in close relation, and having at the other end, a bait-engaging element disposed at an angle to the finger.

4. A device of the class described comprising resilient trapping arms terminating in oppositely extending prongs; a rider slidably mounted upon one of said arms and arranged to be retained thereon by the prong of said arm; a trigger arranged to rock in the rider transversely of the rider-supporting arm, the trigger having at one end a finger to engage the other arm to hold the arms in close relation, and having at the other end, a bait-engaging element disposed at an angle to the finger.

5. A device of the class described comprising resilient trapping arms; a trigger carried by one of said arms and arranged to rock transversely thereof, the trigger having at one end, a finger to engage the other arm to hold the arms in close relation, and having at the other end, a bait-engaging element disposed at an angle to the finger; and means for adjusting the normal positions of the free ends of the arms.

In testimony that I claim the foregoing as my own, I have hereto affixed my signature in the presence of two witnesses.

ELIGE L. ROBERSON.

Witnesses:
P. B. ROELL,
E. P. PRICE.